3,144,066
SELF-LOCKING FASTENER
Christine Mae Van Hecke, 7746 Faust, Detroit, Mich.
Filed Dec. 9, 1960, Ser. No. 74,802
1 Claim. (Cl. 151—7)

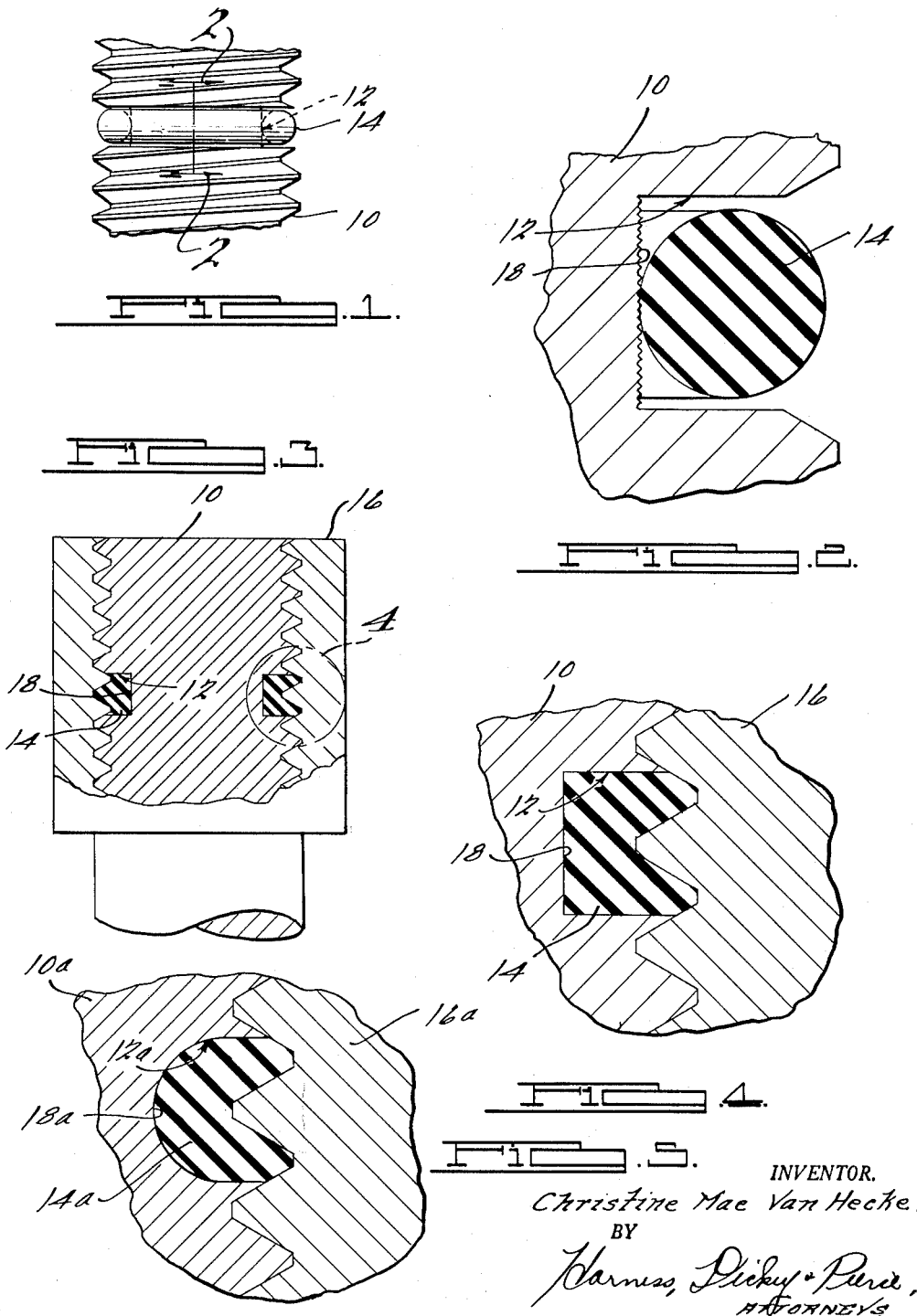

This invention relates to a prevailing torque type locking device for locking a pair of threadably engaged members.

There are many applications in which it is desirable to have a locking device in which relative axial movement is available between a pair of locked members which are threadably engaged and in which adjustments can be made between the locked members axially in either direction without the requirement of a high breakaway torque and without eliminating the holding force of the lock. In some applications it is also desirable that a pneumatic, hydraulic and generally fluid tight pressure seal be provided between the engaged members. The device of this invention is of a simple and inexpensive construction utilizing commercially available parts and provides both of the desirable features mentioned above.

Therefore, it is an object of this invention to provide a locking device of the prevailing torque type for locking a pair of threadably engaged members and which provides a hydraulic pressure seal between the threadably engaged members.

It is an object of this invention to provide a simple and inexpensive device for locking a pair of threadably engaged members under a prevailing torque.

It is an object of this invention to provide a simple and inexpensive device for locking a pair of threadably engaged members under a prevailing torque and for effecting a fluid tight pressure seal therebetween.

Other objects, features, and advantages of the present invention will become apparent from the subsequent description and the appended claim, taken in conjunction with the accompanying drawings, in which:

FIGURE 1 is a fragmentary elevational view showing a locking and sealing member disposed upon the threaded portion of a bolt in accordance with the invention;

FIGURE 2 is an enlarged, fragmentary, sectional view taken along the line 2—2 of FIGURE 1;

FIGURE 3 is a partially sectioned elevational view showing the relationship between the bolt with the locking and sealing member disposed thereon as shown in FIGURES 1 and 2 and as in engagement with a female member;

FIGURE 4 is an enlarged, sectional view of the area indicated 4 in FIGURE 3; and FIGURE 5 is an enlarged, fragmentary, sectional view illustrating another embodiment of the invention.

In general, the locking and sealing action is provided by inserting a locking and sealing member in an annular groove located on a threaded portion on one of a pair of matably threaded members. The locking and sealing action occurs when the members are threadably engaged and the threads on the other of the pair of matable members engage the locking and sealing member mounted on the one member. More specifically, a threaded male member or bolt 10 (FIGURES 1 and 2) is provided with an annular generally rectangularly shaped groove 12 axially defined by a pair of radial walls for receiving a resilient and deformable locking and sealing member or O-ring 14 having a circular cross-section. The volume of the O-ring 14 is substantially equal to the volume of material removed from the bolt 10 in cutting or otherwise forming the annular groove 12. The bolt 10 is then threaded into a female member 16 until the threads of the female member 16 completely engage the sealing and locking member 14 (FIGURE 3). In FIGURE 4 it can be seen that at full engagement the O-ring 14 substantially fills the cavity between the annular groove 12 and the female member 16 and, because of its resilience and deformability, is able within the elastic limit of the member 14 to conform essentially to the impression of the threads of the female member 16.

The effectiveness of the locking action or magnitude of prevailing torque is related to the frictional force between the locking and sealing member 14 and the flanks of the threads of the female member 16. This frictional force is a function of the coefficient of friction and the normal force applied to the flanks. Since the locking member 14 is resilient, the force used in deforming or displacing the locking member 14 causes that member to exert a corresponding force against or normal to the flanks of the threads of the female member 16. Thus, the magnitude of the frictional force or prevailing torque is a function of the normal force or the force of deformation of the locking member 14.

In the embodiment described above, in order to provide the maximum force in deformation and hence the maximum frictional or locking force, an O-ring 14 is used having a volume substantially equal to the volume enclosed by the annular groove 12 and the threads of the female member 16 in the region of the annular groove 12.

The sealing and locking member 14 is made of rubber or some other resilient and deformable material which will not be deformed beyond its elastic limit upon engagement with the female member, and will consequently resume its normal shape upon disengagement. If the member 14 is made of a material which is readily deformable but not resilient, a permanent impression will be made in the member 14 by the female member 16, thereby lessening its locking and sealing effectiveness. Commercially available rubber O-rings are satisfactory for many applications, thus providing an inexpensive device in those instances. When sealing action is desired in addition to the locking action, the member 14 is preferably made of a material which is not subject to attack by the gas or fluid to be sealed.

In the free state, the O-ring in the embodiment shown in FIGURES 1 through 4 preferably has an internal diameter less than the diameter of the root 18 of the annular groove 12 and as assembled is under a circumferential tensile preload. The pretensioning in the O-ring 14 helps to prevent the O-ring from slipping or rolling to one side of the groove 12 during assembly with the female member 16 and thus helps to provide an even distribution of the O-ring 14 with respect to the groove 12 and the engaging threads of the female member 16. As a further means for preventing the O-ring 14 from rolling or slipping to one side of the groove 12 upon engagement with the female member 16, the root 18 of the annular groove 12, as shown in FIGURE 2, can be circumferentially knurled.

In a modified design, FIGURE 5, an annular groove 12a in a male member or bolt 10a has a root 18a with a semi-circular profile. The curvature of the profile of the root 18a is similar to that of the O-ring 14a and helps to prevent slipping and rolling and to provide an even distribution of the O-ring 14a with respect to the groove 12a and the engaging threads of the female member 16a. As shown in FIGURE 5, the radius of the profile of the root 18a is substantially equal to the radius of the cross-section of the O-ring 14a.

In the embodiments as discussed above, an O-ring was mentioned as the sealing and locking member 14. It should be understood that sealing and locking members of various shapes can be used; for example, with an annular groove 12 of the shape as shown in FIGURE 2, a locking and sealing member having a generally rectangular cross-section could be utilized.

The device as discussed above is also effective in maintaining a fluid tight seal. Upon engagement with the female member 16, the sealing and locking member 14, because of its resilience, exerts a bearing force against the flanks of the threads of the female member 16 and against the sides and the root of the annular groove 12 (FIGURE 4), and thus provides a fluid-tight seal. The presence of pressure, whether hydraulic or pneumatic, tends to increase this bearing force, thereby increasing the effectiveness of the seal with an increase in pressure.

Looking now to FIGURE 3, the male member or bolt 10 can be moved to various axial positions while still providing the locking and sealing actions. This feature of the invention allows an adjustment to be made to an internal portion of a sealed cylinder, for example, by varying the axial position of a bolt while still maintaining a sealed and locked condition. Note that an additional locking effect can be had by providing the male member or bolt 10 with a plurality of axially spaced locking and sealing members 14.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

In a locking device of the prevailing torque type for providing a pneumatic and hydraulic seal, the combination comprising a uniformly threaded female member, a male member having a portion uniformly threaded for engagement with the threaded female member and having an annular groove of generally rectangular cross-section intermediate the ends of said portion, said annular groove having a root portion being circumferentially knurled, and a ring-shaped resilient and deformable locking and sealing member having an inside diameter in its relaxed condition less than the root diameter of said groove and having a generally circular cross-section of a diameter less than the axial distance between the radial side walls of said groove and being disposed in said annular groove under a circumferential tensile pre-load and having a volume substantially equal to the enclosed volume enclosed by said annular groove and by the threaded female member in the region of said annular groove for substantially completely filling said enclosed volume upon engagement of said female member with said locking and sealing member and with said male member on opposite axial sides of said groove.

References Cited in the file of this patent
UNITED STATES PATENTS

| | | |
|---|---|---|
| 996,937 | Mulock | July 4, 1911 |
| 2,246,436 | Downey | June 17, 1941 |
| 2,343,235 | Bashark | Feb. 29, 1944 |
| 2,469,074 | Mueller | May 3, 1949 |
| 2,502,642 | Currlin | Apr. 4, 1950 |

FOREIGN PATENTS

| | | |
|---|---|---|
| 566,254 | Great Britain | Dec. 20, 1944 |